United States Patent
Tsao et al.

(10) Patent No.: US 7,242,436 B2
(45) Date of Patent: Jul. 10, 2007

(54) SELECTION METHODOLOGY OF DE-INTERLACING ALGORITHM OF DYNAMIC IMAGE

(75) Inventors: Sheng-Che Tsao, Taipei (TW); Jackie Hsiung, Taipei (TW); An-Te Chiu, Taipei (TW)

(73) Assignee: Via Technologies, Inc., Taipei (TW)

( * ) Notice: Subject to any disclaimer, the term of this patent is extended or adjusted under 35 U.S.C. 154(b) by 502 days.

(21) Appl. No.: 10/851,242

(22) Filed: May 24, 2004

(65) Prior Publication Data
US 2004/0233330 A1 Nov. 25, 2004

(51) Int. Cl.
*H04N 7/01* (2006.01)
(52) U.S. Cl. ..................................... 348/448
(58) Field of Classification Search ........ 348/448–449, 348/452, 458, 459, 441
See application file for complete search history.

(56) References Cited

U.S. PATENT DOCUMENTS

| | | | | |
|---|---|---|---|---|
| 5,128,776 A * | 7/1992 | Scorse et al. | ............... | 382/240 |
| 5,864,369 A * | 1/1999 | Swan | ......................... | 348/448 |
| 6,166,773 A * | 12/2000 | Greggain et al. | ........... | 348/448 |
| 6,459,455 B1 * | 10/2002 | Jiang et al. | ................. | 348/452 |
| 6,480,231 B1 * | 11/2002 | Bernstein et al. | ........... | 348/448 |
| 6,512,550 B1 * | 1/2003 | de Garrido et al. | ......... | 348/452 |
| 6,515,706 B1 * | 2/2003 | Thompson et al. | ......... | 348/448 |
| 6,618,094 B1 * | 9/2003 | De Haan et al. | ............ | 348/448 |
| 6,661,464 B1 * | 12/2003 | Kokkosoulis et al. | ....... | 348/448 |
| 6,690,425 B1 * | 2/2004 | Worrell | ...................... | 348/445 |
| 7,027,099 B2 * | 4/2006 | Thompson et al. | ......... | 348/448 |
| 7,030,930 B2 * | 4/2006 | Kovacevic | ................... | 348/515 |
| 7,034,888 B2 * | 4/2006 | Lin et al. | ..................... | 348/452 |
| 7,061,540 B2 * | 6/2006 | Weaver et al. | .............. | 348/500 |
| 2002/0085114 A1 * | 7/2002 | Ojo et al. | ................... | 348/452 |

* cited by examiner

*Primary Examiner*—Paulos M. Natnael

(57) ABSTRACT

The present invention provides a selection methodology of de-interlacing algorithm of dynamic image, comprising detecting hardware resource of player system. When hardware resource of player system corresponds to the executing condition of algorithm of line-segment de-interlacing, then selects algorithm of line-segment de-interlacing for de-interlacing. When hardware resource of player system doesn't correspond to the executing condition of algorithm of line-segment de-interlacing, then detects input image to see whether it contains information of P-frame or not. When input image contains information of P-frame, the player system selects algorithm of block-based de-interlacing for de-interlacing. Otherwise, the player system selects whether it takes complete frame as a process unit for deciding frame-based de-interlacing and field-based de-interlacing, and provides users with a higher-resolution dynamic image and a better elasticity of selection.

12 Claims, 1 Drawing Sheet

SELECTION METHODOLOGY OF DE-INTERLACING ALGORITHM OF DYNAMIC IMAGE

BACKGROUND OF THE INVENTION

1. Field of the Invention

This present invention relates generally to a method of image de-interlacing, and more particularly to a selection methodology of de-interlacing algorithm of dynamic image in accordance with performance of player system and encoding condition of input image.

2. Description of the Prior Art

The trend of digitalization has formed as the application of multimedia technology develops; therefore a video/audio player and display system has to include the function of transmitting analog signals to digital signals. There are two kinds of scanning standard of analog television at present, i.e. National Television System Committee (NTSC) and Phase Alternation by Line (PAL). Standard of NTSC is used in Japan or the US, according to which a frame is formed by 525 scanning lines i.e. 525 scanning lines are called a frame, which means the frame is displayed repeatedly at the speed of 30 frames per second. Yet 525 scanning lines that form a frame are not finished in only one scanning. The frame is displayed by scanning one line and then the line following the next line. In other words, after the first line is scanned, the third line is scanned rather than the second line, and then the fifth, seventh, to the $525^{th}$ line respectively. Then the scanning process returns to the second line and repeats, in the following are the fourth, sixth, eighth, etc. Therefore the smooth and clear frame displayed is actually constituted by an odd number, an even number, and then an odd number, the formatting method of which is called "double-space scanning" or "interlacing".

Details described, an interlaced video signal is composed of two fields, each of the two fields containing odd lines or even lines of the image. In the process of image capture, camera will output odd lines of image on instant basis and output even lines of image after 16.7 milliseconds. Amid process of outputting odd lines and even lines of the image, a temporal shift will occur, wherein the temporal shift should be positioned in the system of frame-based processing. For a still frame, a good one can be obtained with this method. But for a frame with motion, the image will become blurred since serration will occur on the edge of the image called feathering. Besides, since field of odd lines and field of even lines are formed by only half amount of scanning lines (262.5 lines), each field of odd lines and field of even lines only has half of the resolution the original image has. Each field of odd lines and field of even lines is displayed at the speed of 60 fields per second. Such frame will not appear to have motion artifacts to men's eyes, but if the frame is enlarged, the scanning lines will appear thick and the frame will become blurred.

The disadvantages of "interlacing scanning" described above can be eliminated by a technique called "progressive scan". In progressive scan, the first, second, third, to the $525^{th}$ line are scanned in order and displayed at the speed of 60 frames per second. Therefore its scanning speed is twice the scanning speed of "interlacing" and the frame is displayed on the monitor with 525 scanning lines, which makes the frame fine and clear, which being the best merit of "progressive scan". Therefore, most of the developed video and audio equipment at present has used this method for scanning and displaying.

However, current video signal of NTSC system uses mainly the method of "interlacing" so far. Therefore, if a frame constituted by interlacing is displayed by a display system using a progressive scan: for instance, when a DVD film edited by interlacing is directly broadcast and displayed on HDTV, only frame of odd lines and frame of even lines can be displayed and the resolution of image will be worse. To solve this problem, the technique of "de-interlacing" should be used. In other words, de-interlacing is a method to convert interlacing to a progressive scan. The misalignment of image should be amended so that a progressive image that can satisfy the vision can be produced.

Besides, the technique of dynamic image compression uses mainly standard of Motion Pictures Experts Group (MPEG) compression. In the process of MPEG compression (or encoding), three different methods are used to compress each frame: Intra-frame (I-frame), Bi-directional frame (B-frame) and Predicted frame (P-frame). Wherein the I-frame cuts a frame as macro block of a 16×16 pixel for processing, each macro block is composed of a luminance block (i.e. Y block) of four 4×4 pixels, a $C_r$ block of one 8×8 pixel and a $C_b$ block of one 8×8 pixel. And the I-frame has no need to put its relation with other frames in consideration since a complete frame is saved. P-frame takes former I-frame as reference frame, wherein the redundant part of frame is not saved and only different part of frame is saved. The principle of B-frame is the same as that of P-frame, the only difference is that B-frame can take former I-frame or P-frame as reference and can also take latter P-frame as reference.

Current Video CD (VCD) or multi-function DVD is edited by images of film using interlacing scanning, therefore a frame is constituted by interlacing when playing. To prevent some problem of a frame constituted by interlacing displayed by the display system using progressive scan, interlacing scanning is necessary. However, in the process of editing a VCD or DVD film, in accordance with some video/audio which use standard of Joint Photographic Experts Group (JPEG) or those films edited by using I-frame of MPEG compressing standard in one disc and films without compression, since dynamic image might only include encoding information of I-frame or only include information of dynamic image, it can't detect motion vectors when playing such kind of film in the video/audio player system and therefore encoding incompatible problem occurs. Consequently, it can't play such kind of film without motion vectors in the player system and it's not convenient for users. Besides, in accordance with a video/audio player system without providing a selection mechanism, when it's restricted for the limit of hardware performance such as insufficient memory or not enough bandwidth, the de-interlacing algorithm in the hardware system requiring more requirements cannot execute. And it cannot display with best image quality for lack of the selection mechanism of de-interlacing algorithm.

SUMMARY OF THE INVENTION

In consideration of importance of de-interlacing for output image quality of video/audio player system, increase of convenience and elasticity of user's operation and etc, the present invention provides a selection methodology of de-interlacing algorithm of dynamic image, comprising steps:

First step is detecting hardware resource of player system. When a hardware resource of player system corresponds to the executing condition of algorithm of line-segment de-interlacing, algorithm of line-segment de-interlacing is selected for de-interlacing. In second step, when a hardware resource of player system doesn't correspond to the executing condition of algorithm of line-segment de-interlacing, input image is detected to see whether it contains P-frame information or not. When the input image contains P-frame information, player system selects algorithm of block-based de-interlacing for de-interlacing. Otherwise, player system determines and selects whether it takes complete frame as a process unit, wherein the above de-interlacing algorithm to be decided whether complete frame is taken as a process unit or not can be a frame-based de-interlacing or a field-based de-interlacing. And the selection is decided according to whether frame or field is taken as a process unit of de-interlacing.

The present invention also provides another selection methodology of de-interlacing algorithm of dynamic image, comprising:

First, it produces a selective menu of de-interlacing according to the hardware resource of player system and provides users with selection of one of them, wherein the selective menu of de-interlacing includes the de-interlacing that hardware resource of player system enables to execute it. Next, it displays the selective menu of de-interlacing produced and provides player system users with selection of one kind of de-interlacing to be a basis of de-interlacing of dynamic image.

According to the present invention, we select the best method of de-interlacing to solve problem of scanning transformation in a video/audio player system (such as VCD/DVD player) and some incompatible problem. The method makes player system select a preferred de-interlacing algorithm in accordance with hardware performance, encoding information of dynamic image and unit size of de-interlacing process to obtain a good-resolution output dynamic image. And the method also increases multiplicity and convenience for operation selection that users can view without complicated operation procedure by built-in automatic selection in a player system.

DESCRIPTION OF THE PREFERRED EMBODIMENT

Figure 1:
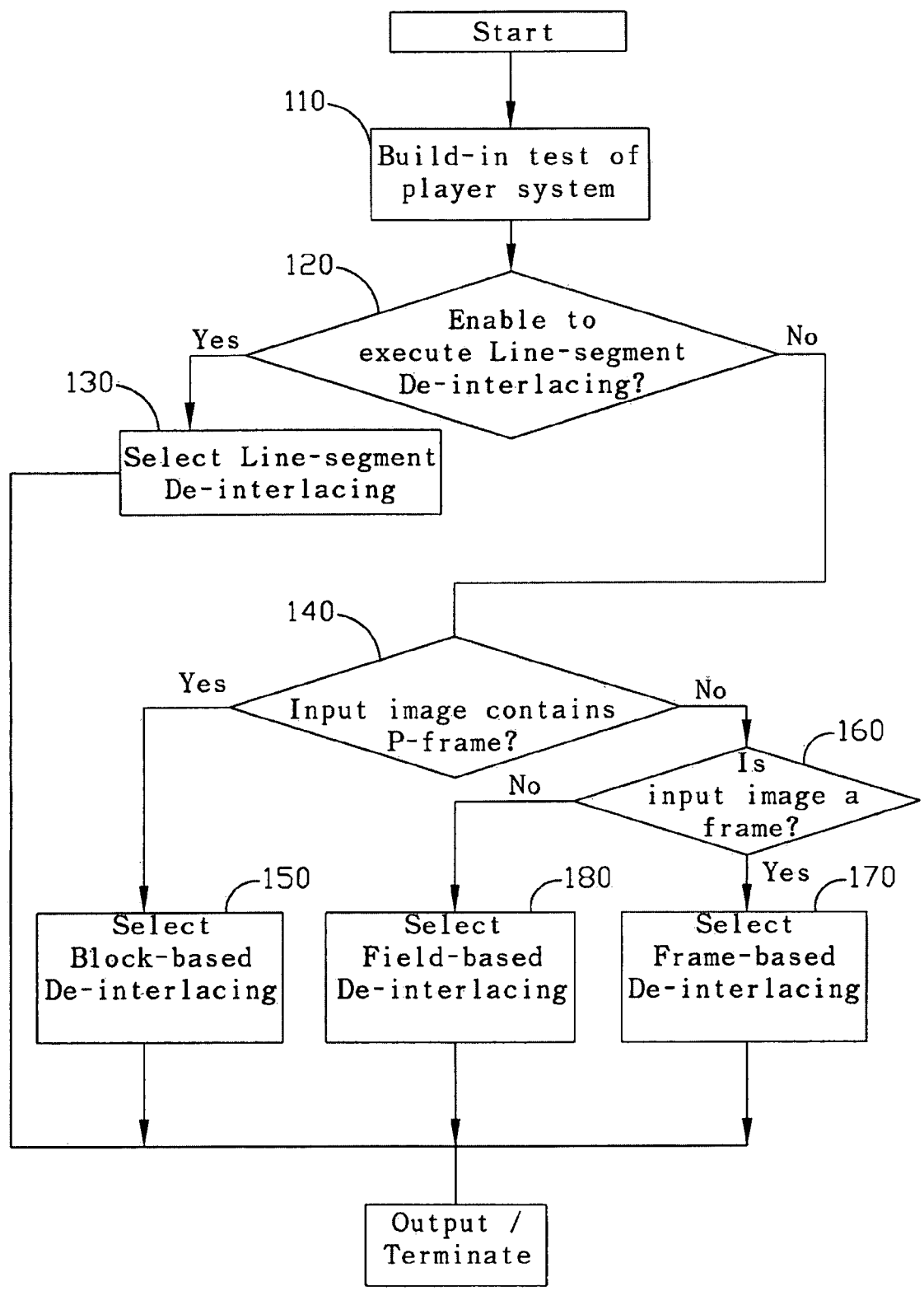
FIG. 1 schematically shows the flow chart of selection methodology of de-interlacing algorithm of dynamic image.

Since the related techniques and methods of compression standard and encoding have been described in detail in prior art; therefore the complete process of these techniques and methods is not included in the following description. Moreover, the art of encoding and decoding used in the present invention adapted from MPEG compressing technique is quoted in summary here to support the description of the invention. And the block diagrams in the following text are not made according to relative position in reality and complete connect diagram, the function of which is only to illustrate the features of the invention.

As is described above, the dynamic image after de-interlacing processing can obtain higher-resolution image quality, wherein the de-interlacing comprises line-segment de-interlacing, block-based de-interlacing, field-based de-interlacing and frame-based interlacing, and so on. These de-interlacings are enabled to execute depending on encoding method of input image and performance of player system. The relation among de-interlacing, encoding method of input image and performance of player system is shown in the table below.

| | Image quality | Requirement for performance of player system | Encoding condition of input image |
|---|---|---|---|
| frame-based interlacing | good | simple | not restricted |
| field-based de-interlacing | good | simple | not restricted |
| block-based de-interlacing | very good | simplest | require P-frame contained |
| line-segment de-interlacing | best | complicated | not restricted |

According to the table above, we realize that line-segment de-interlacing can obtain the best image quality for line-segment de-interlacing taking pixel as a unit of de-interlacing, not restricted by encoding method of input image. The process of information processing and calculating amount are very enormous, therefore it requires a more complicated and higher requirement of performance and resource of player system. For instance, line-segment de-interlacing has to access characteristic value of each line segment, so that it requires enough memory space for cache of characteristic value. To a picture of 720×460 pixel, resolution of the image is 331,200 pixels. If we take each pixel as width of line segment (i.e. the minimum of line segment) when using line-segment de-interlacing, it requires a memory space of 340K Byte. To a block-based de-interlacing, the image quality obtained is only worse than line-segment de-interlacing. It's because block-based de-interlacing takes macro block (i.e. 16×16 pixel) as a unit and gathers motion vectors contained in the macro block for de-interlacing. Therefore encoding method of input image should contain information of P-frame. (It's because encoding of motion vectors is in P-frame, please refer to background of the invention.) Because block-based de-interlacing gathers value of motion vectors of input image and no extra hardware requirement is added, so that requirement of resource of player system is simplest. To a field-based de-interlacing, due to a result of adding according to the value of motion vectors of each odd field (or top field) and even field (or bottom field) for de-interlacing, so that encoding method of input image should contain information of P-frame to obtain good image quality. And finally, to a frame-based de-interlacing, it uses luminance value (i.e. Y value) of each frame for de-interlacing so as to obtain good image quality, and encoding method of input image should not contain information of P-frame.

As is described above, the present invention provides a selection methodology of de-interlacing algorithm of dynamic image, comprising detecting hardware resource of player system. When hardware resource of player system corresponds to the executing condition of algorithm of line-segment de-interlacing, algorithm of line-segment de-interlacing for de-interlacing is selected. When hardware resource of player system doesn't correspond to the executing condition of algorithm of line-segment de-interlacing, input image is detected to see whether it contains information of P-frame or not. When input image contains information of P-frame, player system selects algorithm of block-based de-interlacing for de-interlacing. Otherwise, player system determines and selects whether it takes complete frame as a process unit or not, wherein the de-interlacing algorithm that takes complete frame as a process unit can be a frame-based de-interlacing or a field-based de-interlacing.

To illustrate details of the present invention, FIG. 1 schematically shows the flow chart of selection methodology of de-interlacing algorithm of dynamic image. First, build-on test of player system is shown in step 110. Step 120 detects hardware resource of a player system to see whether it is able to support executing of line-segment de-interlacing. If detecting result shows it is able to support executing of line-segment de-interlacing, then selects step 130 and uses line-segment de-interlacing for de-interlacing of dynamic image. On the other hand, if detecting result shows it is unable to support executing of line-segment de-interlacing, for instance memory or bandwidth of hardware is not enough to support executing of line-segment de-interlacing, then detects input image to see whether it contains information of P-frame in step 140. When detecting result shows input image contains information of P-frame, then selects step 150 and uses block-based de-interlacing for de-interlacing. When detecting result shows input image doesn't contain information of P-frame, then selects step 160 and uses one of frame-based de-interlacing and field-based de-interlacing for de-interlacing. When taking frame as a unit, it selects frame-based de-interlacing for de-interlacing of dynamic image shown in step 170; when taking field as a unit, then selects field-based de-interlacing for de-interlacing of dynamic image shown in step 180. Wherein function of frame-based de-interlacing and field-based de-interlacing can be selected by user's human control, for instance using a remote control for appointing menu and option of player system to select field-based de-interlacing for de-interlacing of dynamic image. Besides, when users decide to select one kind of de-interlacing for executing by themselves, then the player system provides users with a selective menu for selecting one default de-interlacing of the two de-interlacing in accordance with comparison result of de-interlacing above and detecting result of hardware resource of player system.

As is described above, those de-interlacing requiring higher requirement of hardware resource of player system often produce output dynamic image of better image quality. And image quality is usually the first requirement for player system users viewing images, so that the present invention also provides another embodiment of selecting de-interlacing according to image quality, and illustration is shown as follows. First, calculating requirement of hardware resource for each de-interlacing of input dynamic image respectively, wherein the de-interlacing includes line-segment de-interlacing, block-based interlacing, frame-based interlacing and field-based interlacing. Next, comparing with hardware resource of player system, then outputs the hardware resources of player system being able to execute the de-interlacing to a selective menu of de-interlacing and provides users with selection of one of them. In the following, displaying the selective menu of de-interlacing produced, then provides player system users with selection of one of them and being a basis of de-interlacing of dynamic image. Wherein the selective menu comprises one default option by system and it is for increasing elasticity of user's demand about selecting de-interlacing by system.

Moreover, the present invention provides a selection methodology of de-interlacing algorithm of dynamic image. Therefore as is described above, for the detailed illustration of line-segment de-interlacing, block-based interlacing, frame-based interlacing and field-based interlacing, please refer to related patents such as "Method and apparatus for digital video processing and displaying" and "Method and apparatus of adaptive de-interlacing of motion image".

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A selection methodology of de-interlacing algorithm of dynamic image, comprising:

Selecting a first de-interlacing algorithm for de-interlacing when a hardware resource of a player system corresponds to a executing condition of said first de-interlacing algorithm; and Selecting a second de-interlacing algorithm for de-interlacing according to encoding information of dynamic image when a hardware resource of a player system doesn't corresponds to said executing condition of said first de-interlacing algorithm, wherein each image unit de-interlaced of said first de-interlacing algorithm is less than those of said second de-interlacing.

2. The method according to claim 1, wherein said first de-interlacing is a line-segment de-interlacing algorithm.

3. The method according to claim 1, wherein said encoding information of dynamic image contains P-frame information.

4. The method according to claim 3, wherein said P-frame information contains a motion vector.

5. The method according to claim 3, wherein said encoding information of dynamic image contains P-frame information and said second de-interlacing is a block-based de-interlacing algorithm.

6. The method according to claim 1, wherein said second de-interlacing being selected according to encoding information of said dynamic image further comprises selecting a third de-interlacing according to whether said dynamic image takes whole frame as a process unit to be a basis of de-interlacing of said dynamic image.

7. The method according to claim 6, wherein said third de-interlacing is frame-based de-interlacing algorithm when said dynamic image takes whole frame as a process unit.

8. The method according to claim 6, wherein said dynamic image takes field as a process unit, said third de-interlacing is field-based de-interlacing algorithm.

9. The method according to claim 6, wherein said player system directly selects said third de-interlacing algorithm by a control device, and said third de-interlacing is selected from one of field-based de-interlacing and frame-based de-interlacing.

10. The method according to claim 1, wherein said selection methodology of de-interlacing algorithm of dynamic image comprises providing a selective menu in a displaying device and an input device for selecting a de-interlacing algorithm by users.

11. A selection methodology of de-interlacing algorithm of dynamic image, comprising:

calculating requirement of a hardware resource for a plurality of de-interlacing algorithms and producing a calculating result, wherein said plurality of de-interlacing algorithms comprising line-segment de-interlacing, block-based interlacing, frame-based interlacing and field-based interlacing;

comparing said hardware resource of a player system with said calculating result, and displaying those conformed de-interlacing algorithms;

generating a selective menu comprising said plurality of de-interlacing algorithms in accordance with said hardware resource of said player system; and displaying said selective menu for users to select at least one of said plurality of de-interlacing algorithms.

12. The method according to claim 11, further comprises detecting said hardware resource of said player system for producing a detecting result and contents of said selective menu.

* * * * *

UNITED STATES PATENT AND TRADEMARK OFFICE
CERTIFICATE OF CORRECTION

PATENT NO.        : 7,242,436 B2                                        Page 1 of 1
APPLICATION NO.   : 10/851242
DATED             : July 10, 2007
INVENTOR(S)       : Sheng-Che Tsao, Jackie Hsiung and An-Te Chiu It is certified that error appears in the above-identified patent and that said Letters Patent is hereby corrected as shown below:

Title Page, below Item (22), add:

(60) Related U.S. Application Data
"Provisional application No. 60/472,732, filed on May 23, 2003."

Signed and Sealed this
Fourteenth Day of June, 2011

David J. Kappos
*Director of the United States Patent and Trademark Office*